March 9, 1954 P. CHARBONNEL 2,671,445
GAS MASK AND HELMET
Original Filed Aug. 21, 1946 9 Sheets-Sheet 1
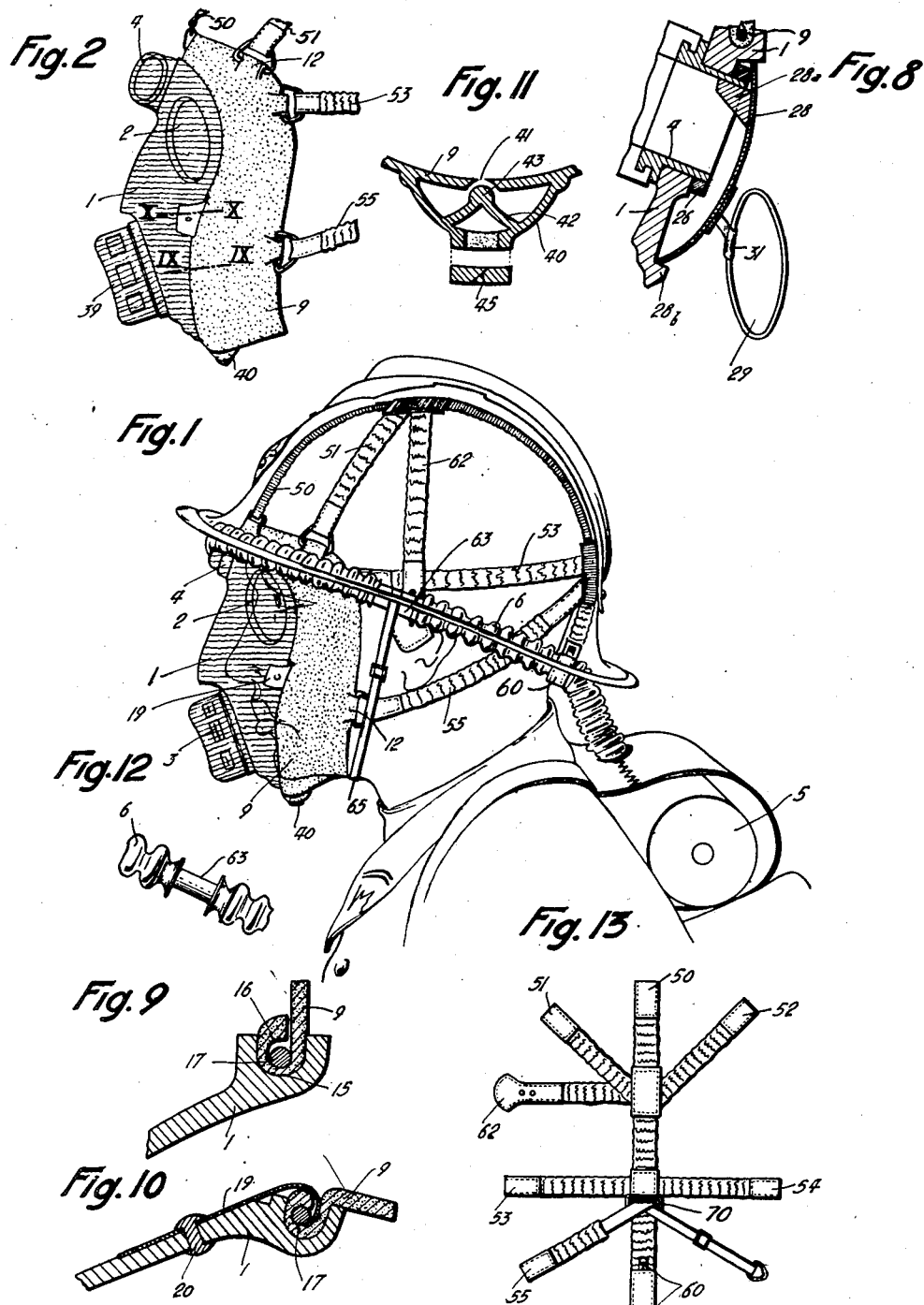
INVENTOR
PAUL CHARBONNEL
BY:
ATTORNEY March 9, 1954 P. CHARBONNEL 2,671,445
GAS MASK AND HELMET
Original Filed Aug. 21, 1946 9 Sheets-Sheet 2
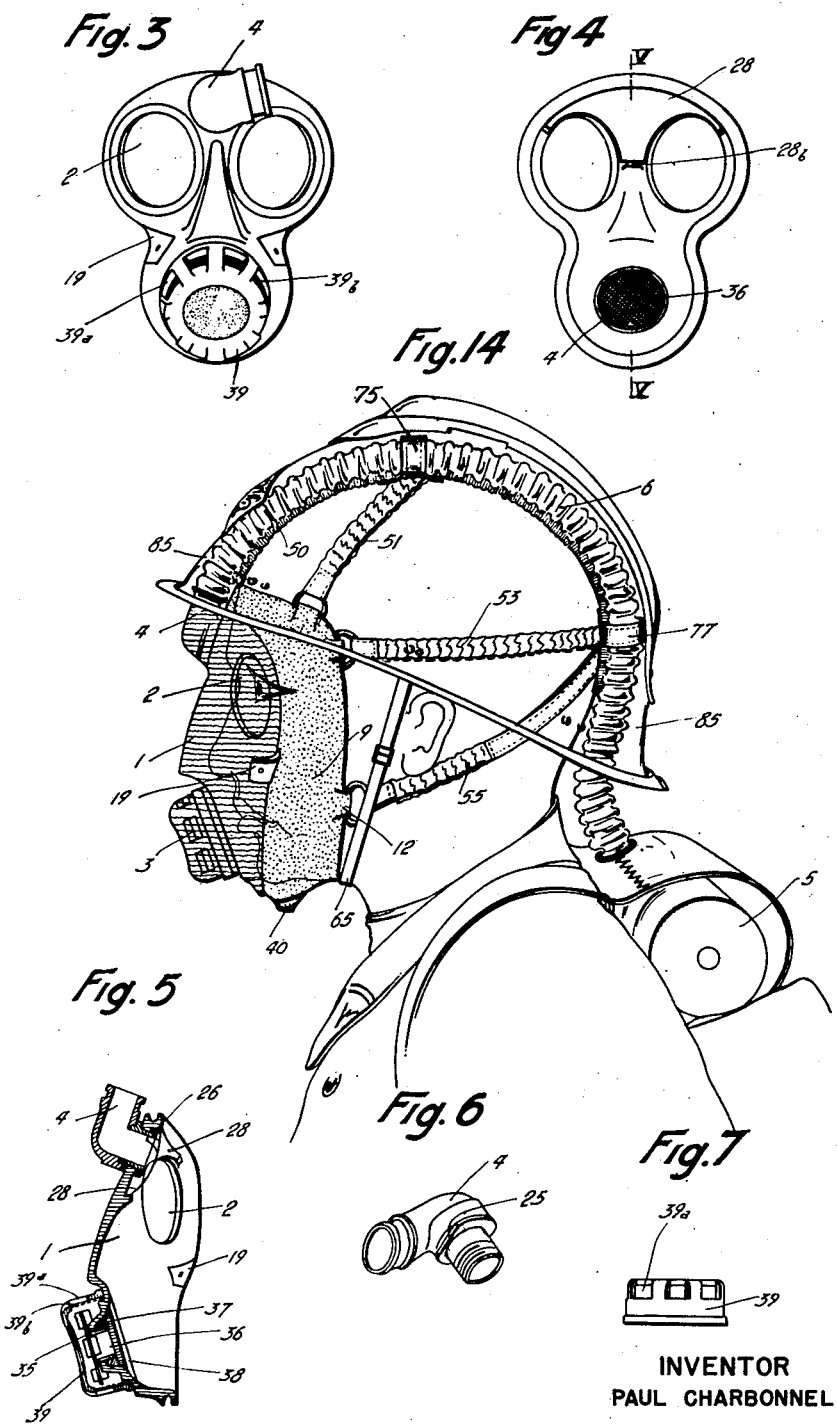
INVENTOR
PAUL CHARBONNEL
BY: *[signature]*
ATTORNEY March 9, 1954 P. CHARBONNEL 2,671,445
GAS MASK AND HELMET
Original Filed Aug. 21, 1946 9 Sheets-Sheet 3
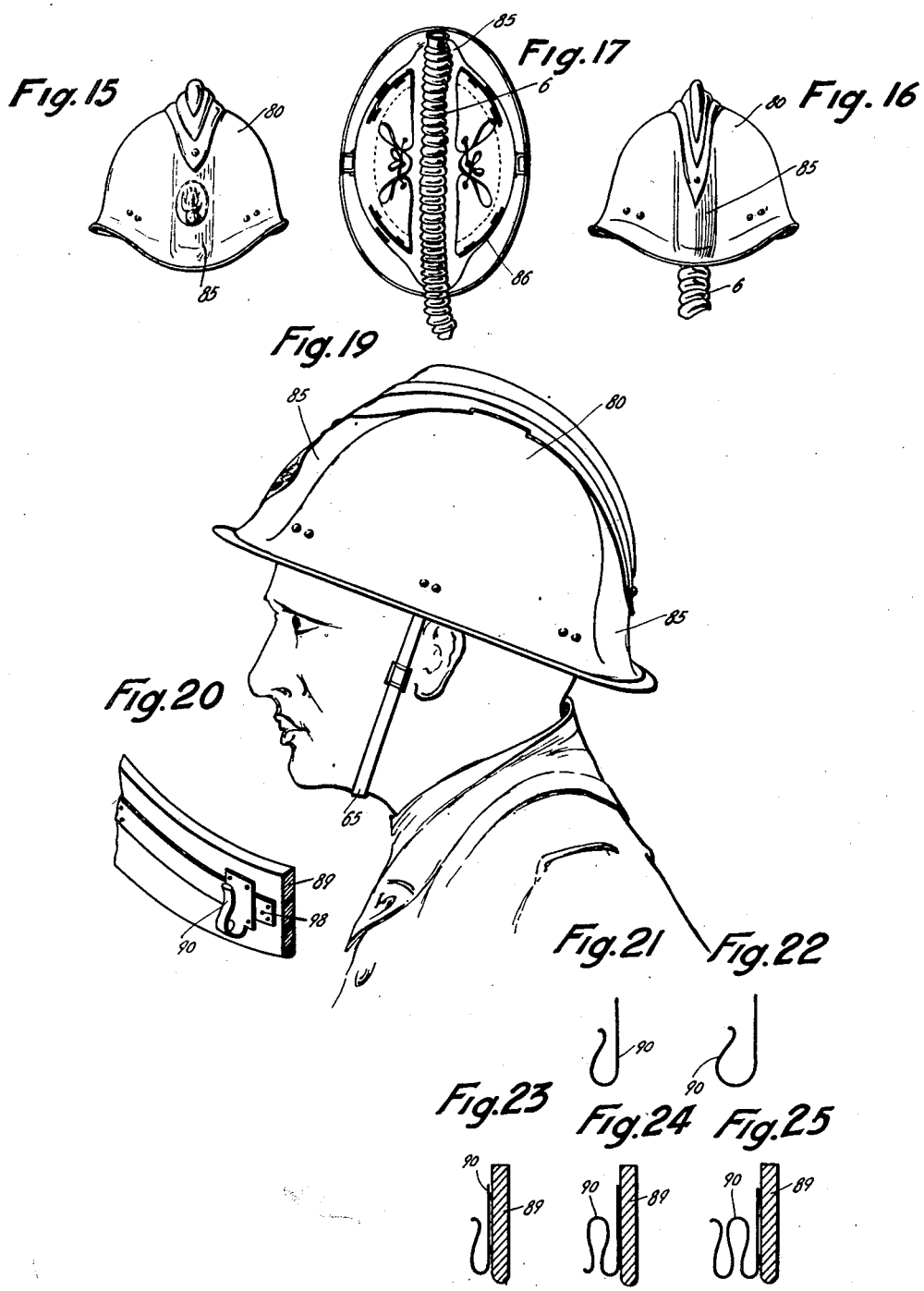
INVENTOR
PAUL CHARBONNEL
BY: *Maxwell E. Sparrow*
ATTORNEY March 9, 1954 P. CHARBONNEL 2,671,445
GAS MASK AND HELMET Original Filed Aug. 21, 1946 9 Sheets-Sheet 4

INVENTOR
PAUL CHARBONNEL
BY
ATTORNEY

March 9, 1954  P. CHARBONNEL  2,671,445
GAS MASK AND HELMET

Original Filed Aug. 21, 1946  9 Sheets-Sheet 5

INVENTOR
PAUL CHARBONNEL

BY: *[signature]*
ATTORNEY

March 9, 1954 P. CHARBONNEL 2,671,445
GAS MASK AND HELMET
Original Filed Aug. 21, 1946 9 Sheets-Sheet 6

INVENTOR
PAUL CHARBONNEL
BY
ATTORNEY

March 9, 1954 P. CHARBONNEL 2,671,445
GAS MASK AND HELMET
Original Filed Aug. 21, 1946 9 Sheets-Sheet 7
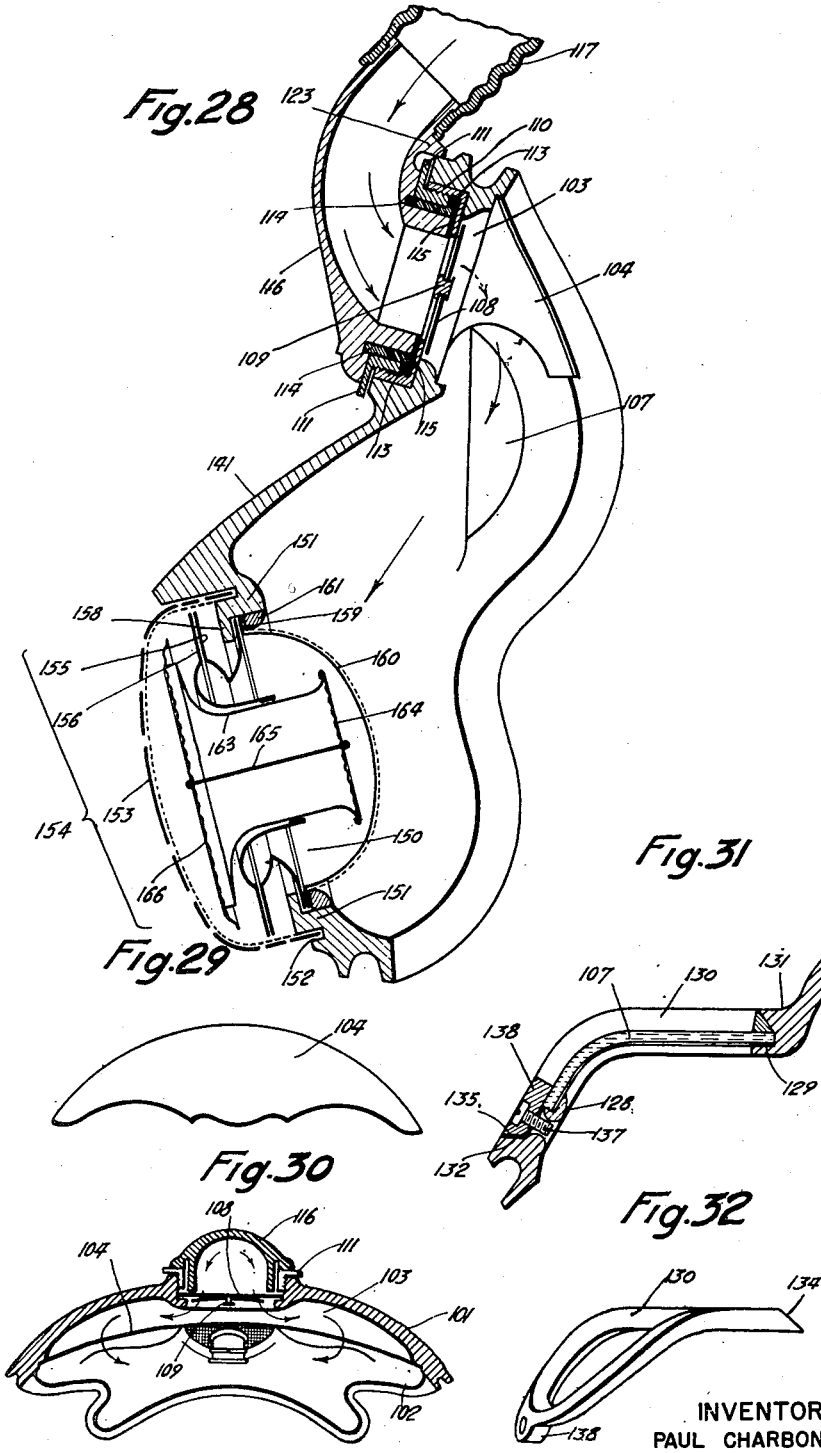
INVENTOR
PAUL CHARBONNEL
BY: *Maxwell E. Sparrow*
ATTORNEY March 9, 1954   P. CHARBONNEL   2,671,445
GAS MASK AND HELMET
Original Filed Aug. 21, 1946   9 Sheets-Sheet 8
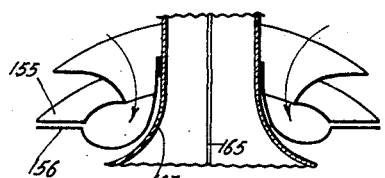
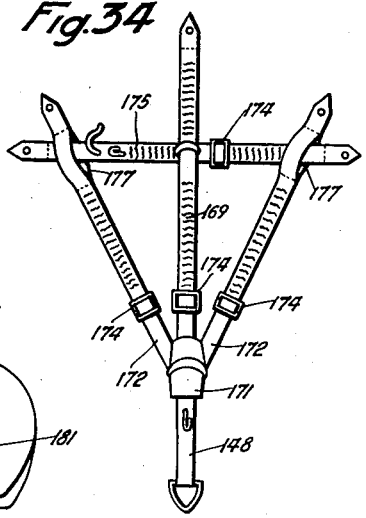
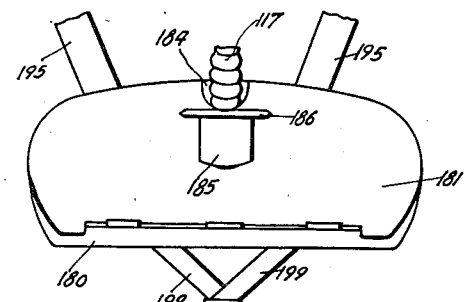
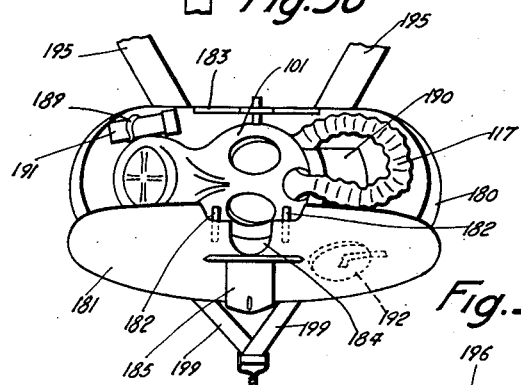
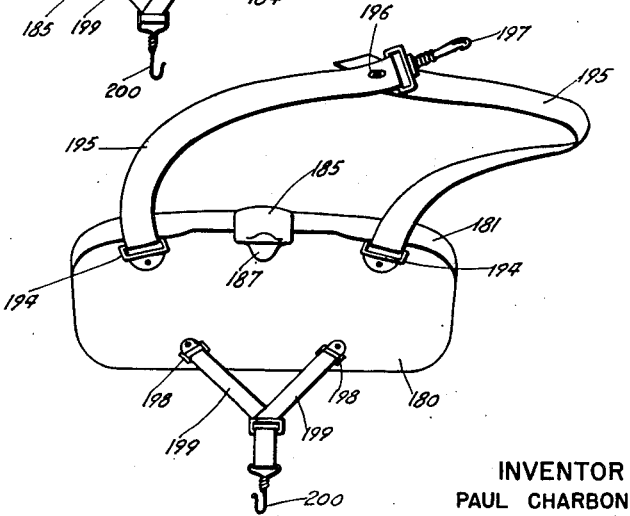
INVENTOR
PAUL CHARBONNEL

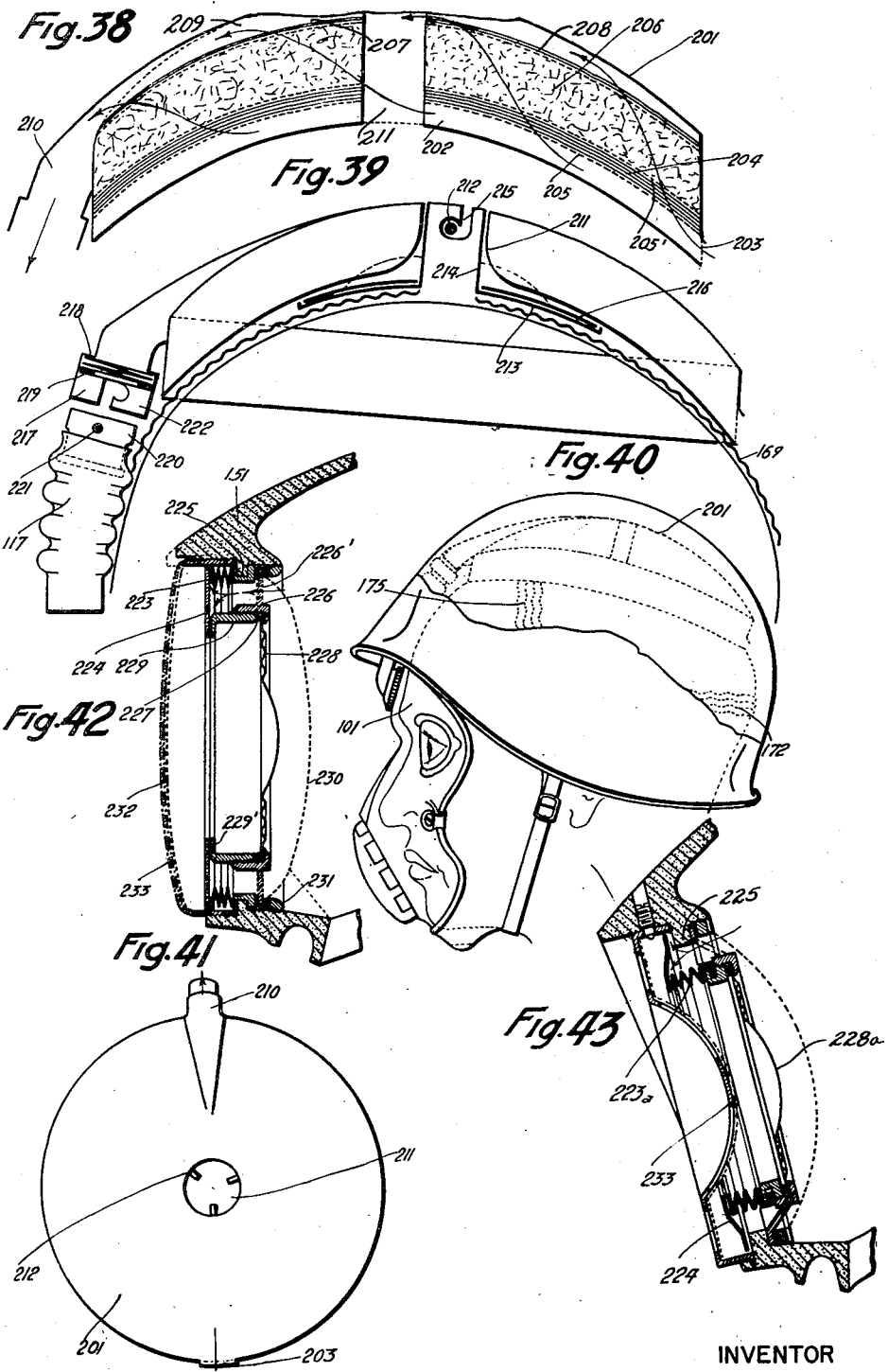

Patented Mar. 9, 1954

2,671,445

UNITED STATES PATENT OFFICE 2,671,445

GAS MASK AND HELMET

Paul Charbonnel, Lyon, France

Continuation of application Serial No. 692,050, August 21, 1946. This application January 31, 1952, Serial No. 269,307

13 Claims. (Cl. 128—141)

The present invention has for its object the embodiment of a system adapted to protect against gases and noxious dust and it comprises, on the one hand, a mask enabling the easy breathing and a good visibility for the attendant and, on the other hand, a helmet designed so as to allow the easy wearing of said mask together with its accessories.

This application is a continuation of Serial No. 692,050, filed jointly by Paul Charbonnel and Robert Raymond Jegou, on August 21, 1946.

The invention further refers to the embodiment of a system of the aforesaid type in which the user is handicapped neither by the wearing of the filtering means—or the respirable air container—nor by the duct connecting these filtering means—or this container—with the protecting mask.

The invention has also for object the execution of a mask that may be applied in an air-tight manner on the face of the wearer, without on this account calling for means liable to compress the neck and the carotid.

A further object of the invention is to execute a helmet allowing, on one hand, the wearing of the filtering means either on the back or above the head of the user and, on the other hand, the yielding ducts which connect the mask to the filtering means or the breathable air container, to pass through the very helmet.

Still another object of the invention is executing a mask which enables the wearer to use optical instruments like correcting glasses, without being embarrassed by said mask.

Still a further object of the invention is the execution of an exhaust valve enabling to breathe out easily, that insures a perfect tightness during inhaling, and allows easy transmitting of speech for instance by the use of a telephone.

The different objects mentioned above are covered in accordance with the invention:

By the fact that the mask is formed by a yielding peripheral part connected in a tight manner to a rigid face member shaped according to the form of the face, to which it comes very near, and said face member—made preferably of molded material—is adapted to come into contact with the face of the wearer at three points only, namely: the forehead and both cheek-bones;

By the fact that the valve provided for the exhaust of used air has a great diameter (superior to half the distance separating the nose from the chin), is of great suppleness and is arranged so as to form a diaphragm for transmitting sounds;

By the fact that the helmet adapted to be worn with the mask is provided with a recess for the yielding duct connecting the mask with the filtering capsule and the latter may in an advantageous form of executiton be located above the head of the wearer where it is fixed in a detachable way, for instance by means of a bayonet joint, to the securing straps of the mask and fits freely in a recess of said helmet; the wearer may thus remove the helmet while keeping on to use the actual breathing device.

The system moreover includes a box for carrying the mask and its auxiliaries, and said box is shaped so as to be easily adapted on the upper part of the back of the wearer.

Other particularities of the protecting device that forms the subject-matter of the invention will make their appearance in the following specification that refers to a certain number of embodiments submitted by way of example in the attached drawings, in which:

Fig. 1 is a side view of a helmet with a mask according to my invention on the head of the wearer, the helmet being supposed to be transparent.

Fig. 2 is a lateral view of the mask, the air admission tube being supposed to be removed.

Figs. 3 and 4 show the face member of the mask seen respectively from the outside and from the inside.

Fig. 5 is a cross-section through line V—V of Fig. 4.

Fig. 6 is a perspective view of the piping connected with the air admission duct.

Fig. 7 shows the cover of the exhaust valve.

Fig. 8 shows a detail on a large scale.

Figs. 9 and 10 are large scale cross-sections through lines IX—IX and X—X of Fig. 2 respectively.

Fig. 11 is a cross-sectional view of the blow off system.

Fig. 12 shows a detail.

Fig. 13 shows the securing strap.

Fig. 14 is a modification of Fig. 1.

Figs. 15, 16 and 17 are respectively front, rear and plan views of the helmet shown in Fig. 14, the hose admitting air to the mask being in place.

Fig. 19 shows the helmet as worn without a mask.

Figs. 20 to 25 show various arrangements of the hooks adapted to hold the cap.

Fig. 28 is a cross sectional view through the plane of symmetry.

Fig. 29 shows the front bearing plate.

Fig. 30 is a horizontal cross section of the front part of the mask.

Fig. 31 is a cross-section of the sighting means.

Fig. 32 is a perspective view of the ring carrying the sighting means.

Fig. 33 is a perspective view of the exhaust valve seen cross-sectionally.

Fig. 34 is a diagrammatic view of the head band or fastener shown lying flat.

Figs. 35, 36 and 37 show under various angles and aspects the box for transporting the mask.

Fig. 38 is a vertical cross-section through the axis of symmetry of a filtering cap secured to the head.

Fig. 39 is a vertical cross section of the cap illustrated in Fig. 38 and shows the manner of mounting the filtering cap on the system of mask securing straps.

Fig. 40 shows through a torn away part of the war helmet, the location of the filtering cap on the head of the user and the bulk of it underneath the helmet.

Fig. 41 is a plan view of the cap.

Fig. 42 is a cross-section through the vertical axis of symmetry of the mask of an improved modification of the valve adapted to allow the exhaust to the outside of the mask of the air breathed out by the wearer.

Figure 18:
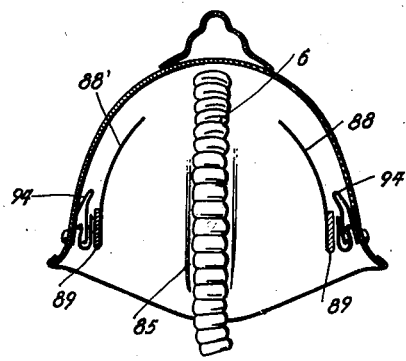
Fig. 18 is a section showing the arrangement of the lining, in front view.

Lastly Fig. 43 is a view similar to Fig. 42, but only partial, of another modification of the exhaust valve.

To make the disclosure more readily understandable I will begin by describing in succession the mask and the helmet adapted more particularly for cooperating therewith.

Referring to Figs. 1 to 14, the mask executed in accordance with my invention comprises:

(a) A rigid face member 1 to which are secured the sighting pieces 2, the exhaust valve 3 and the frontal admission pipe 4 connecting the mask with the filtering cartridge 5 through an annulated pipe 6 held over the head or laterally with reference thereto. Said cartridge is preferably secured to the upper part of the back of the wearer as illustrated in Fig. 1.

(b) A lateral or peripheral rubber part 9 connected with the face member throughout its outer edge and applied fluidtightly all round the face of the wearer. To this part 9 are attached the hooks or buckles of the straps used for securing the face member through the agency of suitably arranged terminal members 12.

The face member is illustrated in detail in Figs. 3 to 5 and it is preferably made of Bakelite, preferably of the shock resisting type showing a high resistance, a low specific weight together with indeformability and resistance to saline air and to all war gases known to this day as well as liquid yperite. This member forms moreover a protection of the face against all shell splinters having a mean penetration power.

As shown more particularly in Figs. 3 and 4, said face member is narrowed in front of the cheeks so as to allow the correct pressing of a fire arm to the shoulder.

The inner portion of the face member described is shaped so as to conform as much as possible to the shape of the face while reducing thus to a minimum the dead space. Said face member bears against the face through stationary bearing points which are the forehead and the two cheek bones, the nose being located naturally inside a suitably sized projection. Consequently, the positioning will always be rapid and correct without the least difficulty.

The outer shape of the face member is substantially identical with the inner shape and gives the whole system an elegant and aesthetic appearance.

As apparent from Figs. 9 and 10, an inner groove 15 open laterally is provided throughout the periphery of the face member with a view to engaging therein a hollow bead 16 forming the end of the rubber edge 9. The bead 16 is held in position by a tensioning wire 17 located inside it and is secured through two metallic hook shaped members 19 secured in their turn by a rivet 20 inside the body of the face member in front of its narrowed part.

The admission piping which is round to allow the easy passage of the air sucked in, is mounted inside an opening provided in the front part of the face member between the two eye pieces or sighting members. Said piping is adapted to move with reference to the mask between two positions, respectively a horizontal and a vertical position as defined by a flat part 25 (Fig. 6) and corresponding respectively to the positions shown in Fig. 1 and in Fig. 14. A safety nut 26 is adapted to lock inwardly the piping 4 in either of said positions. The end of the piping 4 slopes from the front towards the rear with a view to allowing the piping 6 to adhere perfectly to the head throughout its development and to avoid thus any shifting or wobbling thereof. A removable deflecting member 28 is mounted inside the face member in front of the opening of the piping 4 therein so as to allow a sweeping of the eye pieces by the air sucked in the mask and to avoid any condensation. This deflecting member is constituted by a yielding blade provided with a projection 28a engaging the opening of the piping and urged against a small bar 28b rigid with the face member 1 and projecting beyond the inner surface of the latter.

The eye pieces 2 made of so called non-break glasses are located as near the eyes as possible and allow through their vertical position and their setting at a given predetermined angle a perfect and very extended visibility.

Correcting glasses of large diameter 29 (Fig. 8) adjusted to the particular conditions of the wearer may be secured to the deflecting member 28 through arms 31 of which only one is shown on the Fig. 8 and which are adapted to rock on said deflecting member so as to allow the cleaning of said glasses.

The lower part of the face member carries in front of the mouth of the wearer on exhaust valve 35 (Fig. 5) closing a duct 36 held by a fastening nut 37. A trellis work 38 held between the nut 37 and the face member 1 by claws protects the duct on the inside. The outer protection of the valve is provided by a threaded plug 39 provided with lateral openings 39a corresponding to the lips of the valve. A circular trellis work with fine cross meshes 39b is secured inside said plug 39 in front of its opening 39a so as to protect thus the valve against any dust or dirt.

The arrangement thus disclosed allows the rapid passage of the exhausted air without any breaking whatever. For the same reason, the transmission of speech retains its entire intensity with a minimum of deformation.

In front of the chin the rubber strip 9 assumes the shape of a cup in order to allow the mouth to open freely. The center of this cup is provided with a small hole 41 communicating with rubber draining means 40 secured to the outside of the strip for receiving the flow of condensate (Fig. 11).

The draining means are constituted inwardly by two small arms 42 forming an inverted V-shaped member ending with a ball 43 in front of the hole 41. The bottom is reinforced as to thickness and shows a bevel slot 45 parallel to the facial portion.

It will be understood that by exerting a pressure with two fingers on the lateral sides of the draining means the inner arms 42 cause the ball 43 to rise so as to close the hole 41. With increasing pressure the slot 45 opens finally and allows the condensate to flow out.

When the flow of condensate is ended, it is sufficient to release the pressure so as to allow the slot 45 to close while the ball 43 moves away from the hole 41 so as to open again the free passage of the condensate.

Obviously, this operation is performed only at rare intervals and generally when there is no danger.

This draining means, through its simple design, provides a high reliability as to its operation and to its fluidtightness. It removes the always unpleasant sensation produced by the excess perspiration on the face after an extended use of the mask.

The system for securing the mask is constituted by straps of pleated canvas, inwardly reinforced by coil springs and comprising a medial strap 50 and lateral straps 51 to 55.

In the example of Fig. 1 corresponding to the lateral fixation of the pipe 6 along the visor of the helmet, the medial strap 50 is provided with an extension ending with a buckle 60 holding the pipe 6 at its rear end. At the junction between the front straps 51 and 52 is secured a suspending strap 62 dropping to the front of the left ear and allowing the correct positioning of the pipe 6 along the side of the head. This suspension strap is secured to a ring 63 connecting together two portions of the pipe 6 as illustrated in Fig. 12. This ring ending with a groove at both ends prevents the crushing of the pipe under the action of the strap and of the helmet chin strap 65. The mask chin strap 55 is secured as usual to the left hand side of the mask and slides freely inside a special buckle 70 at the junction of the temple straps 53, 54 so as to be capable of more easily engaging the right hand side of the mask.

This sliding does not only bring a great yieldingness to the system but shows a great advantage of shifting the strap away from the neck and avoiding thus any pressure on the latter with the physiological consequence attendant thereto.

In the modified form of execution illustrated in Fig. 14 and in the following figures the pipe 6 passes over the head inside a slider 75 arranged at the junction between the forehead straps and is then held by a further runner 77 at the junction of the temple straps. This runner 77 after adjustment secures in a final manner the pipe 6 through hooking.

In this form of execution, the helmet is completely independent of the mask and is shown separate in Fig. 19. It comprises a body 80 of usual size and appearance, provided with its chin strap 65 and capped by a crest. The body 80 of the helmet shows to either side of its medial longitudinal line a depression 85 having an inner gutter shape and an outer bead shape merging into the shape of the upper portion of said helmet body. The depth of the depression 85 and that of said upper part into which it merges are sufficient for it to be possible to form a continuous open recess for the yielding pipe 6 in a manner such that the latter does not hinder the application of the helmet on the head which is already provided with the mask.

Figure 18A:
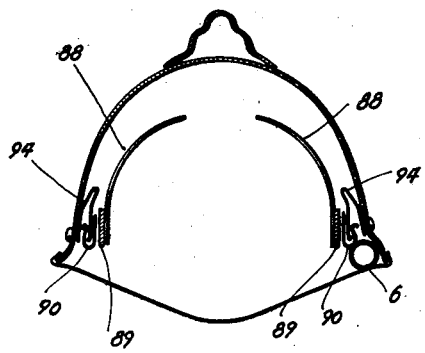
Fig. 18a is a section showing the arrangement of the lining, in rear view.

This putting on the helmet is facilitated as usual through the agency of a lining which fits over the aforementioned straps and which in our improved helmet is open throughout its length in front of the opening of said recess and is constituted by two symmetrical and identical parts 88 and 88' of which only part 88 need be described. This half lining 88 (see Figs. 18 and 18a) carries on the outer surface of its edge 89 two pairs of spring hooks 90 through the agency of which it is removably held on two corresponding supporting blades 94 yieldingly secured to the inner surface of the helmet body.

Figure 18B:
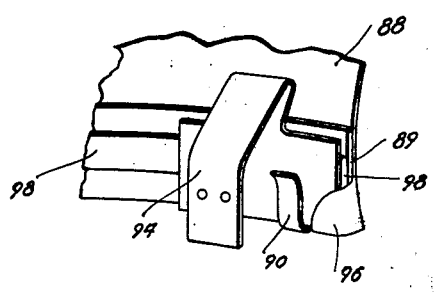
Fig. 18b is a perspective view showing fastening means for the lining arrangement.
Figure 26:
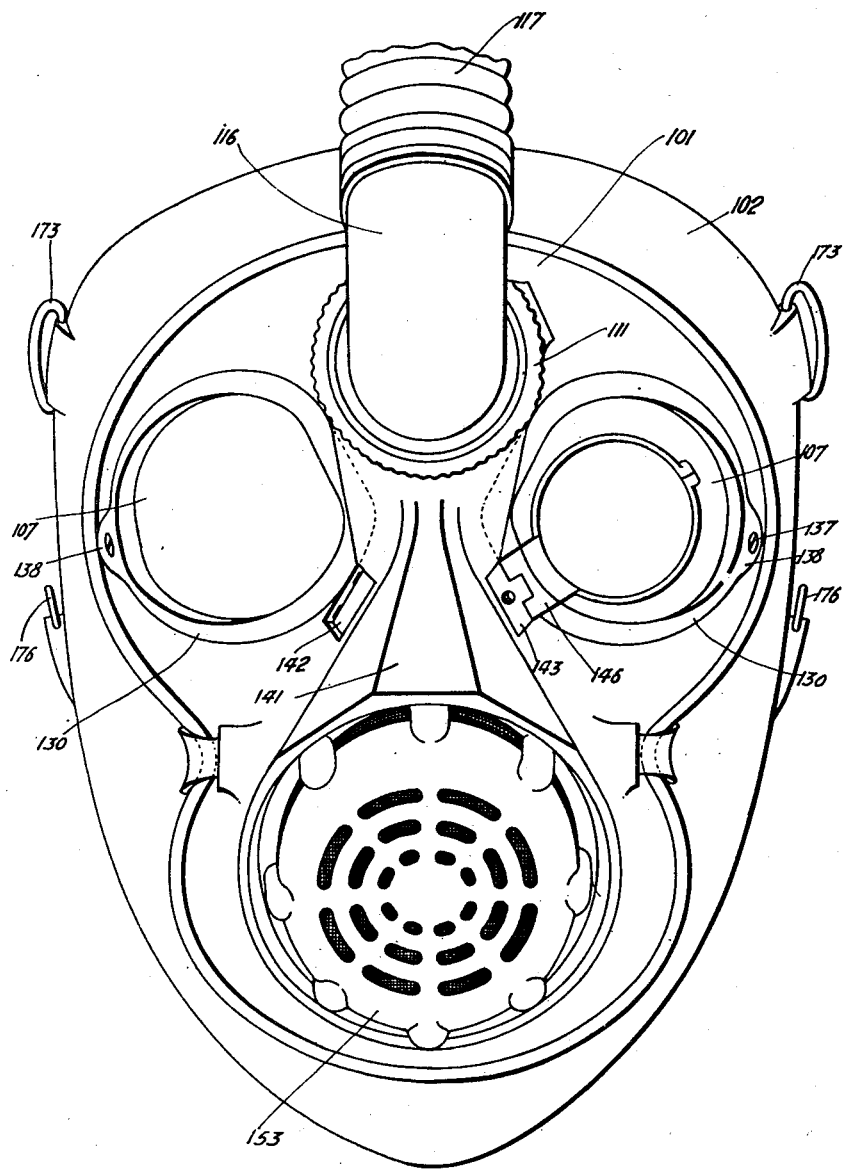
Fig. 26 is a front view of the system with a modified form of execution of the mask.

As apparent in Fig. 18b, the edge 89 is provided on its outer surface and at each terminal portion thereof with a pocket 96 inside which is inserted one end of the corresponding supporting blade 94 so as to to avoid any lateral displacement of the lining.

As shown in Fig. 20, a spring blade 98 is preferably secured throughout the length of the edge 89 in front of the hooks 90 so as to prevent any deformation of this edge between the latter, whereby the wearer is protected against any uneasiness.

In order to conform the lining with the different head sizes, the hooks 90 which are simple for the maximum size are provided with more or less marked loops as shown in Figs. 21 to 23 or may be extended into a further loop (Fig. 24) or loops (Fig. 25) engaged when the lining is positioned on the helmet between the corresponding suporting blade 94 and the inner surface of the body 80 of the helmet.

Such an adaptation is rendered possible in an accurate manner as well when the lining is in a single part and the helmet thus executed may be used as easily with or without the mask.

Obviously the invention is applicable to helmets of any shape whatever suitable for use for any army and for any service.

In the form of execution of Figs. 26 to 34, the mask is provided with a face member 101 which is rigid or semi-rigid and is for instance made of Bakelite while along the edge of said face member is arranged a yielding part 102. Said face member is shaped so as to match substantially the outline of the face while contacting therewith only through three points, to wit: the forehead and the two cheekbones. In particular the part fitted over the nose is sufficiently hollow for the latter not to be touched thereby and to retain its entire freedom for breathing purposes.

The front part of this face member is recessed as shown in Fig. 30 at 103 and the recess thus formed is defined by a rabbet inside which is inserted a front bearing plate 104 made of thin sheet iron for instance; this plate is shaped in accordance with the outline of the forehead and through its agency the rigid face member of the mask is caused to bear against the top of the face of the wearer. It is retained in place automatically through its own elasticity. On the other hand, it closes entirely the opening of said recess on the side of the face with the exception of two narrow slots above the eye pieces 107. Inside the recess 103 is located the intake valve constituted by a disc 108 of rubber or equivalent yielding material, the center of which is fitted on the stem of a knob 109. Said knob is provided in the middle of a cross-shaped member forming the central part of the bottom of a cup-shaped part 110 fitted, during the casting, inside the material forming the rigid part of the face piece. The cup-shaped part 110 is tapped for receiving the thread of a threaded ring 111 provided with a milled flange on the outside of the mask. The ring 111 is bound up with an outer connection or piping 116 and is adapted to swivel between two shoulders holding it axially. One of the shoulders is constituted by the very material of the pipe 116 and the other by the flange 113 of a further ring 114 secured, through casting, inside the material forming said piping 116. This collar 113 bears against a packing 115 inserted inside the cup-shaped member 110, over the annular portion of the bottom of the latter, at the periphery of the central cross or rose shaped part thereof. The other end of the piping is secured to the usual yielding hose 117. When the ring 111 is screwed home the flange 113 is fastened over the packing 115 and this holds the piping 116 against movement with the obtention of a fluidtight joint between the latter and the face member forming part of the mask. By unscrewing said ring 111 slightly, it is possible to provide for an angular setting of the piping 116. Stops 123 define its extreme position to either side of the plane of symmetry of the mask.

The sighting means or eye pieces 107 are preferably made of a plastic material which is translucid and unbreakable and they are incurved laterally so as to increase the field of sight; on the other hand the face member follows closely the outline of the face of the wearer as these eye-pieces are very near the eye. Their outline follows very closely that of the socket. The housing of each eye-piece comprises as shown in Fig. 31 a rabbet 128 inside which the eye piece is held with the interposition of a packing 129 while a securing ring 130 holds it down as shown in Fig. 32. The outline of said housing has such a shape in front of the rabbet that it forms in the vicinity of the nose a slope 131 directed towards the outside of the mask and located to the front of the eye-piece, whereas in the part removed from the nose it forms on the contrary a bearing surface 132 which is outwardly flaring; said two parts 131, 132 merging gradually into one another through a gradually sloping surface. The securing ring 130 has a shape which mates that of its recess i. e. its edge located on the nose side is bevelled at 134 outwardly so as to fit underneath the slope 131 while its opposed edge is bevelled at 135 inwardly. Moreover this ring 130 is slightly yielding so that once the part 134 of its edge has engaged the underside of the slope 131, a pressure on the part 135 of this same edge urges still more said ring inside the rabbet 128 inside which it compresses the packing 129. This pressure is ensured in the present case by a screw 137 held against dropping and provided with a countersunk head passing through a peripheric boss 138 of the ring, said screw being adapted to be screwed into the rigid part of the face member near the lower part of the temple.

Figure 27:
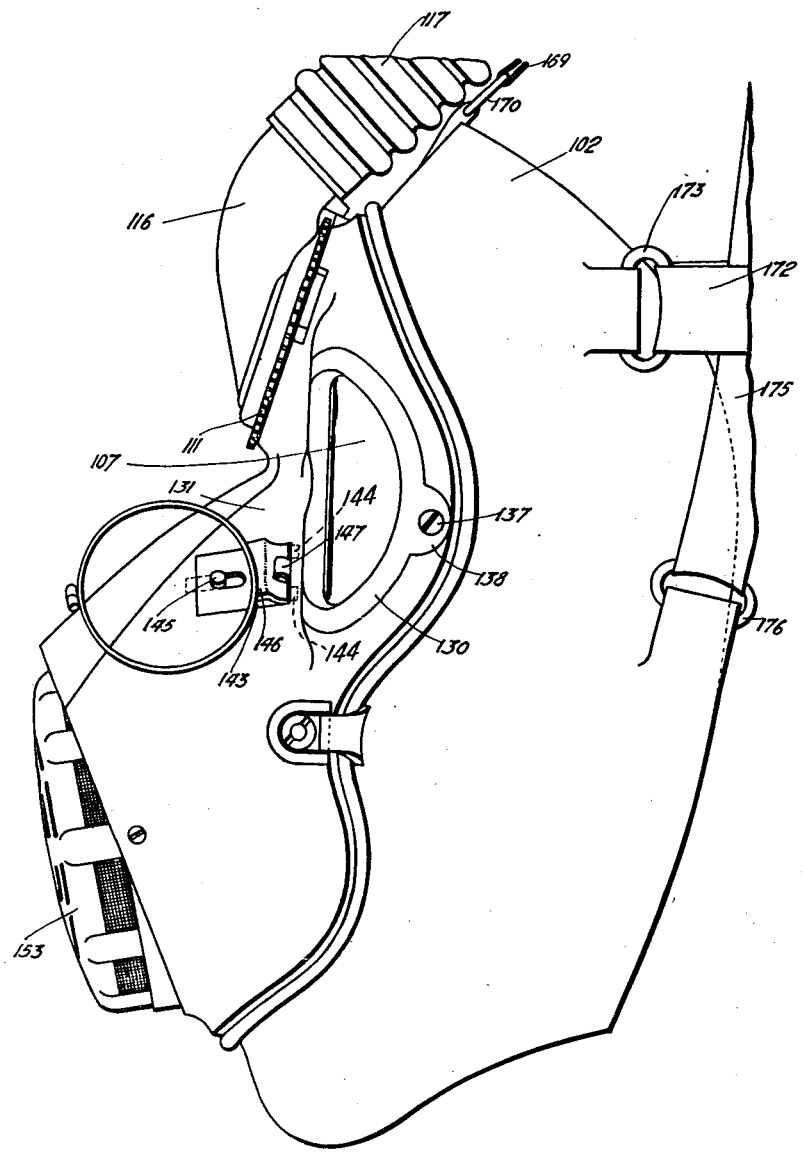
Fig. 27 is a corresponding side view.

At each side of the projection 141 forming the nose of the mask is provided a hollow part 142 inside which is fitted a plate 143 (Fig. 27) provided in its plane with two small projections or teeth 144 engaging two corresponding small recesses opening inside said recess 142. The plate 143 is furthermore provided with a sliding spring urged bolt 145 arranged so as to be capable of engaging a corresponding staple provided on the side of the hollow part opposed to that into which open said small recesses. When it is bolted, the plate 143 is thus held firmly and rigidly in place while remaining easily removable. To this plate is hingedly secured a support 146 adapted to receive a correcting glass adapted to the sight of the wearer of the mask. The hinge is arranged so that the support 146 may rock with reference to the side of the nose of the mask 141 when it is not desired to use the said support as shown in Fig. 27 or else so that it may project to the front of the eye-piece as illustrated on the right hand side of Fig. 26. A spring 147 (Fig. 27) holds this support in either of these two positions.

In the zone located in front of the wearer's mouth, the face member is provided with a large diameter opening 150 with an edge 151 which is thicker than the remainder of the face member. At the outer surface of this reinforced edge is formed a circular groove 152 inside which is engaged the edge of a hollow protecting plug 153 appearing in the form of a cup with a perforated bottom, which plug is screwed over the threaded wall of the groove 152. Underneath said protecting plug is located the exhaust valve 154 of a very large diameter constituted in the present case by two yielding rings 155 and 156, made of rubber for instance, laid flat over one another and secured to one another through a plurality of spaced points. The inner edge of the ring 155 arranged on the side of the mask is folded outwardly while the inner edge of the ring 156 is incurved towards the side of the mouth so as to constitute guiding means forming a channel which suitably directs the air towards the two interengaging parts of said rings 155 and 156. The air thus directed moves the interengaging lips of said ring apart and escapes throughout their periphery. The folded edge of the ring 155 bears against a circular flange 158 formed inside the opening 150 by the edge 151 of the latter and said folded edge is held in place by the flange 159 of the protecting sieve 160 which assumes the shape of a cup and separates the valve from the wearer's mouth, said flange cooperating with a fastening ring 161 screwed inside a tapped bearing of the edge 151 of the opening 150. The folded edge of the ring 156 is fitted over an acoustic tube 163 and is secured to the outer wall of the latter which is thus suspended to the valve through the center of which it passes throughout. The end of this tube which is the nearest the mouth is closed by a diaphragm or membrane 164 connected through a central metallic rod 165 with another diaphragm 166 of larger diameter which closes the opposite end of said tube which flares gradually outwardly on the outside of the valve. The tube 163 and the diaphragms 164 and 165 form an acoustic box which improves the transmission of speech.

At the tip of the chin is provided a small recess or cup separated from the inside of the mask by a perforated partition so that sweat and condensation water produced inside the respirator may collect therein. This cup does not communicate with the outer atmosphere so as not to affect detrimentally the fluidtightness of the mask. It is sufficient to cleanse it after the respirator has been taken off the head.

The securing of the respirator on the wearer's face is facilitated by the head band illustrated in Fig. 34. The latter comprises a medial strap 169 attached to a ring 170, arranged at the upper part of the front yielding part of the respirator in the plane of symmetry of the latter, and is adapted to extend from front to rear over the middle of the head.

The opposite end of this strap 169 carries a plate 171 bearing against the occiput and to which is secured in its medial part an occipital strap 172 the ends of which are attached to the ring 173 secured to the mask above the temples. Each of the two strands of this occipital strap is adjustable individually through a buckle 174. At an intermediate point of the medial strap 169 is secured a transversal strap 175 forming therewith a four arm cross-shaped system and the ends of said strap 175 are attached to a ring 176 secured to the mask at the lower part of the temples. Further buckles 174 allow adjusting the lengths of the medial strap 169 and of the transversal strap 175. The latter furthermore engages runners 177 provided on the occipital strap in proximity with the temples. Furthermore there is provided a short lug 148 starting from the bearing plate 171 and adapted to provide for the fixation of the hose. The attaching of the straps to the rings of the face member is ensured by a riveted knob.

For the transportation of the mask, we may make use of a box illustrated in Figs. 35 to 37. The latter includes a body 180 having as a base a plane rectangular surface to which are connected lateral round walls showing no sharp edge so as to avoid any engagement with other bodies. In particular, the edges of the container 180 are constituted by two convex cups. The general elongated comparatively flat shape of the box is thus somewhat similar to that of a kidney bean. The box is open at its upper part nearly throughout its cross-section; it can be closed by a cover 181 hingedly secured to the front edge of the bottom wall of the box 180. The cover may be held closed by two springs 182 secured to the inner surface of the lid and adapted to engage a groove 183 of the body 180. The edge of this lid registering with the rear convex surface of the box is notched in its center at 184 so as to allow the passage of the yielding breathing hose. This notch can be closed by an outer foldable shutter 185, pivotally secured to the lid and urged open by a spring 186. This shutter which may be arcuate is held closed in antagonism to the action of said spring 186 by a spring urged catch 187 secured to the body 180 of the box at the rear thereof. Hooks 189 inside the box 180 allow securing thereto the filtering cartridge 190 in a horizontal position together with its yielding connecting pipe, its chloride box 191 and the wound dressing means 192. The mask is laid on horizontally so as to fit over the cartridge.

To the upper end of the rear flat surface of the box are secured near the lateral convex edges thereof two pivoting buckles 194 to which are secured the suspending braces 195 which are characterized through their being constituted by two parts pivotally secured together through a rotary rivet 196. A snap-ring 197 is secured to the middle of said braces 195. To the bottom part of the same flat surface of the box are secured two further buckles 198 to which are secured the ends of the two strands 199 of securing braces of adjustable length provided with a further snap-ring 200.

The box thus arranged may be carried either over the shoulder by means of the suspending braces or else on the back. When the box is carried on the back, one of the strands of the strap or braces 195 passes over one of the shoulders and the other strand is passed over the other shoulder while the snap-ring 197 is attached in front of the wearer's body to a ring on his belt, not illustrated, and the snap-ring 200 engages in the wearer's back another ring of said belt. By reason of the braces 195 being made of two parts pivotally secured together, said braces are always in close contact with the body. In any case, the flat surface of the box bears against the wearer's body and the convex surface forms the upper surface thereof; the lid is then substantially vertical with its hinge at its lower edge.

In waiting position the box is carried on the back of the wearer and is held as disclosed, but with the shutter 183 open so as to allow the passage of the breathing-in hose after the mask has been removed from its box and suspended through one of the straps of the head band to a hook or to a button of the wearer's clothes. These preliminary operations are preferably executed while the box is suspended to the neck through the braces 195 slung over the shoulders. It is then easy to open the cover to remove the mask from its box and to close the cover after engaging the yielding pipe inside the notch 184 after which the box is rejected on to the back and secured as disclosed hereinabove. The positioning of the mask on the wearer's face is then executed when required in the usual manner and very speedily.

In the modification shown in Figs. 38 to 43 of the accompanying drawing, the filtering cap includes a casing 201, the shape of which is substantially circular and the concave lower surface of which substantially mates the shape of the top of the skull. The casing 201 is subdivided in its vertical direction into a certain number of compartments. The lower compartment 202 serves as a chamber for the foul air and communicates rearwardly with the outer atmosphere through the opening 203. Above the compartment 202 are arranged superposed layers of filtering paper 204 held between two trellises or perforated partitions 205 and 205' defining the first filtering compartment. Above said compartment is arranged a filtering chamber 206 filled with activated carbon. This compartment is defined at its upper end through a felt layer 207, lying on a trellis 208 above which is located the last chamber 209 filled with filtered air and communicating with a pipe 210.

The circuit of the air is consequently as follows: the foul air enters through the port 203 into the chamber 202 and passes in succession through the layers of filtering paper 204, the layer of activated carbon 206 and lastly the felt layer 208 so as to enter in a purified state into the chamber 209 out of which it passes into the channel 210 connected with the mask proper.

In order to allow its easy fixation, the filtering cap is provided in its center with a chimney 211 carrying inwardly and near its upper end three bayonet studs 212. The medial strap 169 of the mask which is reinforced along its longitudinal axis is rigid with the bearing ring-shaped member 213 of a socket 214, the upper end of which is provided with three notches 215 adapted to cooperate with the three bayonet studs 212. To the ring shaped member 213 is secured through rivets a spring 216 of any suitable type which may be flat, spiral, helical, of the three-arm type, or the like.

To place the filtering cap on the head after the gas mask itself has already been placed, it is sufficient to fit the chimney portion 211 over the socket 214, to depress the cap 201 in order to compress the spring 216 and to impress a slight rotation thereto for engaging the bayonet studs 212 in the cooperating notches 215. The cap is thus held correctly and rigidly in place.

The connection between the filtering cap and the mask is executed through the pipe 210 communicating as already disclosed with the chamber 209 containing purified air. The channel 210 ends with a socket 217 inwardly fitted with a spring 218 urging a joint packing 219 into position. At the end of the connecting pipe 117 leading to the mask is secured a ring 220 with three bayonet studs 221 adapted to cooperate with the corresponding notches 222 provided in the socket 217.

For connecting the mask with the filtering cap, it is sufficient to introduce the ring 220 inside the socket 217, to exert a slight pressure for compression the spring 218 and to impart a slight rotation thereto so as to engage the bayonet studs 221 inside the corresponding notches 222 of said socket 217.

The arrangement of the air filter on the head of the user underneath the helmet shows numerous advantages and in particular the following may be mentioned: the omission of the pipe connecting the mask with a filtering cartridge carried in a bag or the like sack; a greater freedom for the movements of the wearer and a better protection of the filtering means. The very design of the filtering cap allows obtaining large filtering surfaces providing an easy breathing and a sufficiently long operative life of the filter.

In a modification, the filtering cap instead of being secured to the straps of the mask may be mounted directly in the upper portion of the helmet by means of any suitable securing means.

It is also possible to provide without widening the scope of our invention for the use of a filtering cartridge with a large filtering surface having a structure similar to that described hereinabove and adapted to be carried inside a box, a bag, a sack or the like inside which may also be housed the mask proper during periods of non-use.

Furthermore it is possible to provide for the filter a filtering material other than that disclosed above by way of example only.

As shown in Fig. 42, an improved valve may include resilient means constituted by a cylindrical bellows 223 ending with an annular lip 224, the base of the bellows engaging, with the interposition of a fluidtight packing, an inner annular rib 225 on the reinforced edge 151 of the mask. The lip 224 is secured only at a number of spaced points of its outer edge to the bellows 223 whereby, owing to the flexibility and resiliency of members 223 and 224, the breathed out air escapes as illustrated by the arrows both through its outer periphery and its inner periphery.

Behind this valve proper is located a rigid annular fitting 226 perforated at 226' for the passage of the breathed out air towards the valve 224. At the inner periphery of the ring 226 and inside a suitable recess is secured with the interposition of a fluidtight joint 227 the edge of a large sized diaphragm 228 locked by means of a safety nut 229 whose outer portion is folded inwardly at right angles for constituting a flat seat or stationary lip 229' cooperating with the movable annular lip 224 of the bellows of the valve.

The above system is protected inside the mask by a trellis 230 locked by a ring 231 screwed over the wall forming the edge 151 of the mask. Outwardly the same arrangement is protected by a trellis 232 lining the inner surface of a perforated plug 233 screwed in the reinforced edge of the mask and adapted to be locked by means of a screw sunk in the side thereof.

It is apparent that, by reason of the large size of the diaphragm 238 arranged at a suitable distance of the wearer's mouth, sound will be transmitted with a minimum damping which allows even the use of the telephone. Furthermore, by reason of the large size of the valve and of its yielding character as provided by the bellows, we obtain a wide passage for the air breathed out together with perfect fluidtightness in the closing. It will be noticed moreover that by reason of the angular setting of the members forming the valve with reference to the axis of symmetry of the system, the sounds emitted during the opening of the valve may be directed partly towards said axis and reinforce the sounds transmitted by the diaphragm.

The modified valve illustrated in Fig. 43 differs from the above embodiment by the fact that the inner edge of the external lip 224 is clamped on one end of the bellows 223a whilst its external edge is free and co-operates with a seat constituted by a ring-shaped projection 225 of the central rigid portion of the mask; the other end of the bellows is secured to the inner ring of the bearing or frame of the diaphragm 228a, said bearing being inwardly convex in order to bring the diaphragm near the mouth. Further, the protecting plug 233 is also inwardly convex in order to reduce the sizes.

Obviously my invention is not limited to the details of execution illustrated in the drawing and described hereinabove solely by way of example. These details may be modified in any desired manner without exceeding the scope of my invention. Thus for instance instead of including a removable connection, the hose connecting the mask with the filtering capsule may be provided with a number of thin corrugations very near one another so as to allow a substantial elongation.

Furthermore, if certain auxiliaries of the mask are no longer to be removable, it is sufficient to secure them simply to said mask by fitting them inside the mould during the casting of the rigid face member.

What I claim is:

1. A gas mask comprising a face member, a flexible conduit connected with said face member and adapted to supply a respirable fluid to a wearer, securing means for supporting said face member on the head of the wearer, adjustable means for selectively maintaining said flexible conduit at a plurality of different angles relative to said face member, and holding means for attaching said conduit to said securing means in at least one selected position relative to said face member.

2. The combination, with a gas mask according to claim 1, wherein said flexible conduit is positionable centrally above the head of the wearer, of a helmet provided with a central longitudinal groove adapted to accommodate said conduit when the helmet is placed on the head of the wearer.

3. An exhaust valve for a gas mask, comprising a first annular element, a second annular element registering with said first element, resilient means normally forcing said two elements against each other, guide means forming a channel for exhaled air, said channel terminating at said two elements so that exhaled air passing therethrough forces the two elements apart against the action of said resilient means, and a speech-transmitting diaphragm extending across and sealing the opening of one of said annular elements.

4. An exhaust valve according to claim 3 wherein said resilient means comprises a bellows supporting said first annular element, said guide means comprising a cylinder provided with a flange representing said second annular element, said cylinder being mounted concentrically with said bellows and forming an annular channel for the exhaled air therewith.

5. An exhaust valve according to claim 3 wherein said cylinder is positioned inside said bellows, the speech-transmitting diaphragm forming part of said guide means and being bridged across the bore of said cylinder.

6. An exhaust valve according to claim 3 wherein said guide means includes an acoustic tube concentrically mounted inside said two annular elements, said tube being provided with a pair of axially spaced diaphragms, extending across the ends of the tube, and a rod interconnecting the centers of said diaphragms.

7. In a gas mask, a rigid face member provided with a pair of sockets adapted to receive transparent members for the wearer to look through, transparent members secured in said sockets and each having a major, substantially straight portion adapted to lie like a standard spectacle glass in front of the eyes of the wearer and a minor, substantially straight portion rigid with and laterally adjoining said major portion at an obtuse angle, said face member being shaped to position said major transparent member portions a few millimeters from the eyeballs of the wearer, and a pair of mountings for correcting glasses secured to said face member respectively adjacent said sockets and forwardly of said major straight portion thereof.

8. In a gas mask, a face member according to claim 7 wherein said mountings are pivotally secured to said face member and adapted to support a pair of correcting glasses in a first position adjacent and parallel to said straight portions and in a second position removed from the field of vision of the wearer.

9. The combination, with a gas mask having a face member, a flexible hose extending from said face member and a container housing filtering means connected to said hose, of a box provided with a cover, said box including securing means for holding said container in place therein and being adapted to receive said face member and hose along with said container, said cover being formed with a recess through which said hose may extend when the face member is taken from the box, thereby permitting use of the mask without removal of said container from said box.

10. The combination according to claim 9, further comprising closure means on said cover adapted to seal off said recess when the mask is not in use.

11. In a gas mask, a drainage valve comprising a substantially horizontal wall portion provided with an aperture, a cup member suspended underneath said wall portion so as to seal off said aperture, said cup member having a resilient bottom portion slitted at an angle to the vertical, and a plug member inside said cup member supported on said bottom portion in such manner that upward pressure upon said bottom portion, tending to spread the slit thereof so as to allow for the escape of moisture accumulated in said cup member, presses said plug member against said aperture, thereby preventing the passage of atmospheric air through said aperture.

12. A gas mask comprising a face member having a rigid central portion that is substantially shaped so as to match the shape of the face in order to come very near to the latter, and in contact with the face only at the forehead and cheeks, a flexible peripheral portion connected in an airtight manner with the rigid central portion and arranged to airtightly apply against the face, a pivoting connection provided adjacent the top of the rigid central portion of the face member, and means for immobilizing this connection in various positions.

13. A gas mask comprising a face member, a head harness having straps connected with said face member and adapted to secure said face member to the head of a wearer, a conduit connected with said face member and adapted to supply a respirable fluid to the wearer, at least one loop connected with said straps for securing said conduit in position on the straps, and coupling means adjustably connecting said conduit with said face member, said coupling means being adapted to fix the conduit in a plurality of different positions relative to the face member.

PAUL CHARBONNEL.

No references cited.